United States Patent
Yadav et al.

(10) Patent No.: US 8,688,828 B2
(45) Date of Patent: Apr. 1, 2014

(54) SESSION LAYER FOR MONITORING UTILITY APPLICATION TRAFFIC

(75) Inventors: Navindra Yadav, Cupertino, CA (US); Atul Mahamuni, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 154 days.

(21) Appl. No.: 13/219,773

(22) Filed: Aug. 29, 2011

(65) Prior Publication Data

US 2013/0054784 A1 Feb. 28, 2013

(51) Int. Cl.
*G06F 15/173* (2006.01)

(52) U.S. Cl.
USPC ............... 709/224; 709/217; 709/232

(58) Field of Classification Search
USPC .......................... 709/217, 224, 232
See application file for complete search history.

(56) References Cited

U.S. PATENT DOCUMENTS

| | | | | |
|---|---|---|---|---|
| 7,944,844 | B2 * | 5/2011 | Ee et al. | 370/248 |
| 2008/0052394 | A1 * | 2/2008 | Bugenhagen et al. | 709/224 |
| 2008/0162690 | A1 * | 7/2008 | Karagounis | 709/224 |
| 2008/0209033 | A1 * | 8/2008 | Ginter et al. | 709/224 |
| 2012/0054330 | A1 * | 3/2012 | Loach | 709/224 |

OTHER PUBLICATIONS

Yingyi Liang et al., "Understanding and Simulating the IEC 61850 Standard," Computer Science Research and Tech Reports, University of Illinois IDEALs, Apr. 22, 2009.

* cited by examiner

*Primary Examiner* — Phuoc Nguyen
(74) *Attorney, Agent, or Firm* — Edell, Shapiro & Finnan, LLC

(57) ABSTRACT

Techniques are provided to facilitate monitoring of utility application traffic streams. At a network device that routes utility application traffic for utility devices, control information is received, where the control information is configured to cause the network device to monitor utility application traffic that passes through the network device. The network device monitors a header inserted into utility application traffic messages based on the control information.

23 Claims, 17 Drawing Sheets

```
┌─────────────────────────────────────────────────────────────┐
│ AT EACH OF A PLURALITY OF NETWORK DEVICES, RECEIVE CONTROL  │  113
│ INFORMATION THAT COMPRISES AN IDENTIFIER FOR A SPECIFIC MULTI-│
│       TERMINAL PHASE MEASUREMENT UNIT SESSION               │
└─────────────────────────────────────────────────────────────┘
                              │
                              ▼
┌─────────────────────────────────────────────────────────────┐
│ COLLECT, AT EACH OF THE PLURALITY OF NETWORK DEVICES, FLOW  │  123
│   METRICS ASSOCIATED WITH THE SPECIFIC MULTI-TERMINAL PHASE │
│                MEASUREMENT UNIT SESSION                     │
└─────────────────────────────────────────────────────────────┘
                              │
                              ▼
┌─────────────────────────────────────────────────────────────┐
│     SEND TO NETWORK MANAGEMENT DEVICE FROM EACH OF THE      │  132
│  PLURALITY OF NETWORK DEVICES, FLOW METRICS COLLECTED BY THE│
│  PLURALITY OF NETWORK DEVICES FOR THE SPECIFIC MULTI-TERMINAL│
│              PHASE MEASUREMENT UNIT SESSION                 │
└─────────────────────────────────────────────────────────────┘
```

SESSION LAYER FOR MONITORING UTILITY APPLICATION TRAFFIC

TECHNICAL FIELD

The present disclosure relates to monitoring utility application traffic flows.

BACKGROUND

In utility networks, such as power, water, natural gas, etc., a data network is deployed alongside the utility equipment to manage and monitor operation of the utility equipment. In current utility networks, existing monitoring systems are not capable of providing sufficient information to troubleshoot failure points in the network. Current networks also make it difficult to locate potential where failures have previously occurred. Moreover, current networks do not facilitate testing of the network to determine whether it is ready to support a utility application traffic stream.

DESCRIPTION OF EXAMPLE EMBODIMENTS

Overview

Techniques are provided to facilitate monitoring of utility application traffic streams. At a network device that routes utility application traffic for utility devices, control information is received, where the control information is configured to cause the network device to monitor utility application traffic that passes through the network device. The network device monitors a header inserted into utility application traffic messages based on the control information.

Example Embodiments

Figure 1:
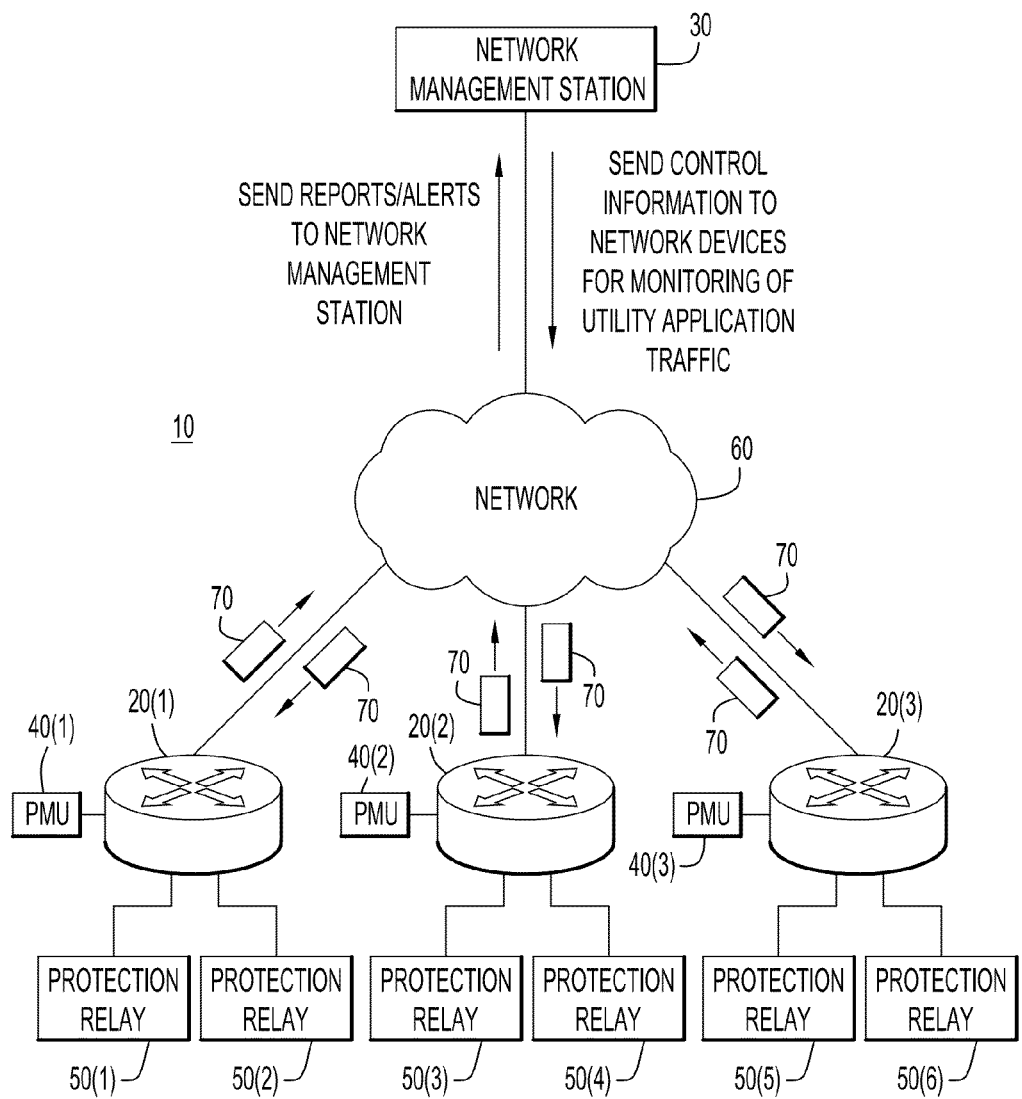
FIG. 1 is a block diagram showing an example network in which utility application traffic is routed and monitored using a session layer header inserted into utility application traffic packets.

Referring first to FIG. 1, a block diagram is shown of a utility network environment 10 including a plurality of routers/switches 20(1)-20(N) and a network management station/device 30. For simplicity, the term "network device" is used for the routers/switches 20(1)-20(N), and is meant to include a router, a switch, a combination switch/router, a wireless router, a combined switch/firewall device, etc. The term network management station used herein is meant to include a traditional network management station as well as any device or functions that are meant to provision, configure, manage, monitor, and audit the network devices and the health and performance of network devices. Each network device 20(1)-20(N) is connected to one or more utility devices, such as a phasor measurement unit (PMU) and protection relay. A PMU measures the electrical waves on an electricity grid to determine the "health" of the system. A PMU can be a dedicated device, or the PMU function can be incorporated into a protection relay or other device.

A phasor is a complex number that represents both the magnitude and phase angle of the sine waves used in electricity grids. Phasor measurements that occur at the same time are called "synchrophasors", as are the PMU devices that allow their measurement. Measurements made by PMUs are sampled from widely dispersed locations in the power system network and synchronized from a common time source of a global positioning system (GPS) radio clock.

In the example shown in FIG. 1, there is a PMU 40(1) coupled to network device 20(1), a PMU 40(2) coupled to network device 20(2) and a PMU 40(N) coupled to network device 20(N). Multiple PMUs may be coupled to any given network device, and the arrangement shown in FIG. 1 is only an example. Similarly, there are protection relays 50(1)-50(N) coupled to respective network devices as shown in FIG. 1. A protection relay is a switch configured for the protection of electrical transmission lines, and is designed with accurate operating characteristics to detect overload, short-circuits, and other faults.

The network management station 30 communicates with the network devices 20(1)-20(N) by way of network 60. The network 60 may include a wired local area network, wired wide area network, wireless local area network and a wireless wide area network, or any combination thereof. The network management station 30 sends control information to the network devices 20(1)-20(N) to configure them to monitor utility application traffic. The network devices 20(1)-20(N) send reports and alerts generated from monitoring of utility application traffic to the network management station 30. Utility application packets or messages that pass through the network devices 20(1)-20(N) are shown in FIG. 1 at reference numeral 70.

Figure 2:
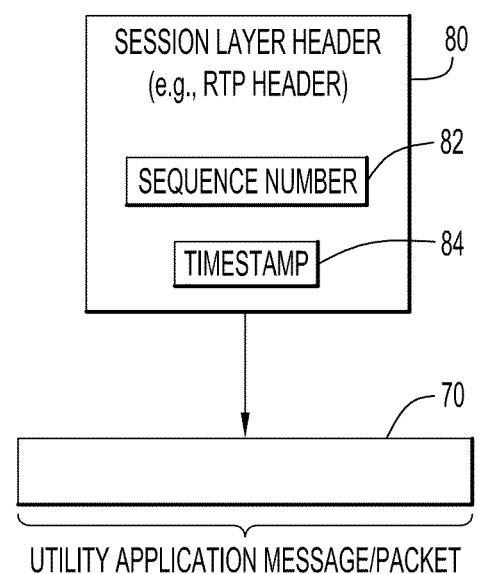
FIG. 2 is a diagram showing an example session layer header inserted into a utility application traffic packet.

According to the techniques described herein, a session layer header is inserted into utility application traffic packets or messages. Turning to FIG. 2, a diagram is shown of a utility application packet/message 70. A session layer header is shown at reference numeral 80 that comprises a sequence number field 82 and a timestamp field 84. There may be other fields in the header 80, but these two fields are of primary interest because they introduce more information to the session layer of packets 70 that do not otherwise have this information embedded in the session layer. The header 80 therefore allows for performance monitoring of flows of utility application traffic packets 70 based on latency, jitter, order of delivery, packet drops, etc., that would not otherwise be possible. An example of a utility application protocol is International Electrotechnical Commission's (IEC) 61850 standard for electrical substation automation. An example of header 80 is a Real-time Transport Protocol (RTP) header, such as that defined in RFC 3550. Examples of utility applications include, Teleprotection, Centralized Remedial Action Scheme (CRAS), PMUs, etc. The session layer information is generated by the device that is the source of the packet. This may be a PMU or a protection relay, such as those depicted in FIG. 1. Additionally, if the source of the packet does not insert these fields, then the first hop switch/router (e.g., any of the routers 20(1)-20(N)) may also insert extra fields in the session header to carry this information.

Figure 3:
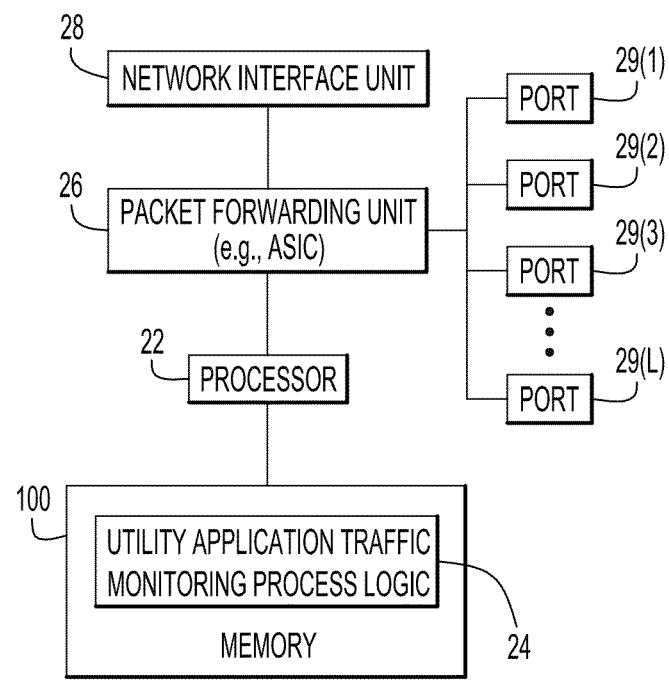
FIG. 3 is a block diagram showing an example of a network device configured to monitor utility application traffic according to the techniques described herein.

Reference is now made to FIG. 3 for a description of a block diagram of a network device, shown generically at reference numeral 20(i), according to one example. The network device 20(i) is a packet switching, routing or forwarding device that operates in accordance with the Ethernet protocol, for example. The network device 20(i) comprises a processor 22, a memory 24, a packet forwarding/switching unit 26, a network interface unit 28 and a plurality of ports 29(1)-29(L). The processor 22 is a data processor, e.g., a microprocessor or microcontroller, that is configured to execute software instructions stored in memory 24. The packet forwarding unit 26 includes one or more application specific integrated circuits (ASICs) configured to perform the packet queuing and routing operations of the network device 20(i). The network interface unit 28 is a network interface card that enables Ethernet communications over a wired network. The ports 29(1)-29(L) are ingress and egress ports used to receive incoming packets and to output outgoing packets. The packet forwarding unit 26 performs hashing operations on packets to determine to which of the egress ports (among ports 29(1)-29(L)) packets are output from the network device 20(i) into the network.

The memory 24 may comprise read only memory (ROM), random access memory (RAM), magnetic disk storage media devices, optical storage media devices, flash memory devices, electrical, optical, or other physical/tangible memory storage devices. The memory 24 stores computer executable software instructions for utility application traffic monitoring process logic 100. The utility application traffic monitoring process logic 100 comprises software instructions that cause the processor 22 to monitor utility application traffic, and particularly the headers 80 of packets 70 (shown in FIGS. 1 and 2), according to the techniques described herein. Thus, in general, the memory 24 may comprise one or more tangible computer readable storage media (e.g., a memory device) encoded with software comprising computer executable instructions and when the software is executed (by the processor 22) it is operable to perform the operations described herein in connection with process logic 100.

Figure 4:
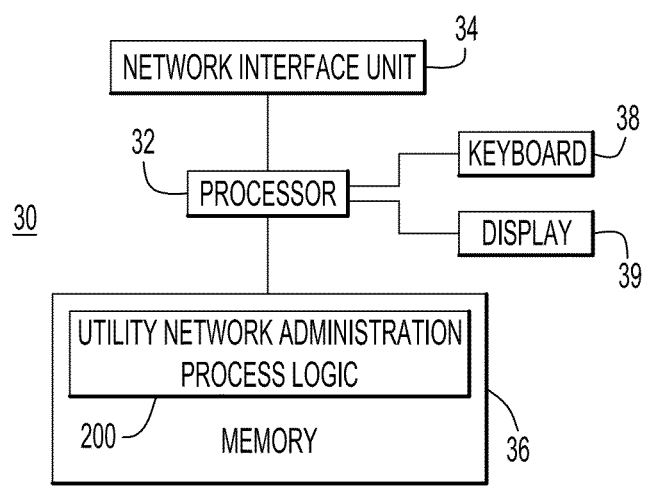
FIG. 4 is a block diagram showing an example of a network management station configured to send control information to network devices to monitor utility application traffic according to the techniques described herein.

Turning now to FIG. 4, a block diagram is shown for the network management station 30. The network management station 30 is a computing device that is configured to cause the network devices 20(1)-20(N) in FIG. 1 to perform certain application traffic monitoring (reporting and alerting) functions. The network management station 30 comprises a processor 32, a network interface unit 34, a memory 36, a keyboard 38 or other user input device and a display 39. Instructions are stored in memory 36 for utility network administration process logic 200 that, when executed by the processor 32, cause the processor 32 to perform various operations described herein from the perspective of the network management station 30. The utility network administration process logic 200 causes the processor 32 of network management station 30 to generate the control information that is sent in suitable messages to one or more network devices.

Figure 5:
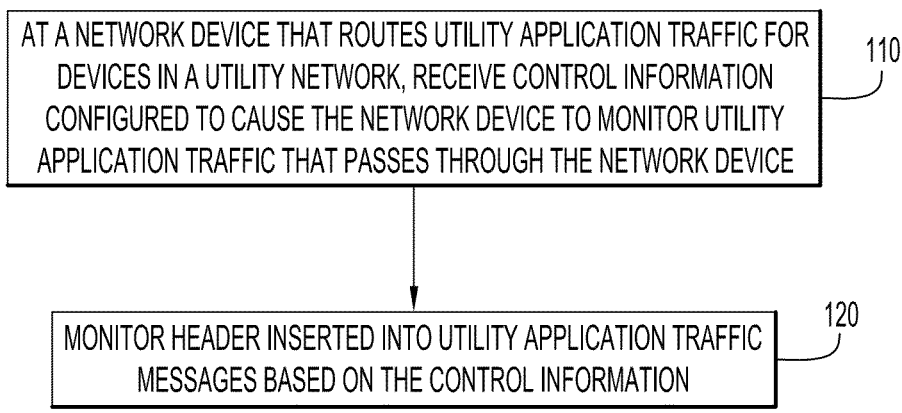
FIG. 5 is a flow chart depicting an example of operations performed in a network device to monitor utility application traffic based on control information received from the network management station.

Reference is now made to FIG. 5 for a general description of the operations of the utility application traffic monitoring process logic 100. Again, these operations are performed at one or more of the network devices 20(1)-20(L), where the network device routes utility application traffic for utility devices or equipment in a utility network. At 110, the network device receives control information configured to cause the network device to monitor utility application traffic that passes through the network device. At 120, the network device monitors a header inserted into utility application traffic messages/packets based on the control information. By monitoring the header, and in particular, the sequence number and timestamp information contained in the header, the network device can obtain performance metrics for the utility application traffic including out of sequence conditions, packet drops, latency, jitter, round-trip delay, etc. FIG. 5 is a high level depiction of the operations of utility application traffic monitoring process logic 100.

Reference is now made to FIGS. 6-17 for a description of several example scenarios for utility application traffic monitoring process logic 100. In these figures, operations with reference numerals between 111-119 refer to more detailed examples of operation 110, and operations with reference numerals between 121-129 refer to more detailed examples of operation 120. Moreover, operations labeled with reference numeral 130 and higher are additional operations of the utility application traffic monitoring process logic 100.

Figure 6:
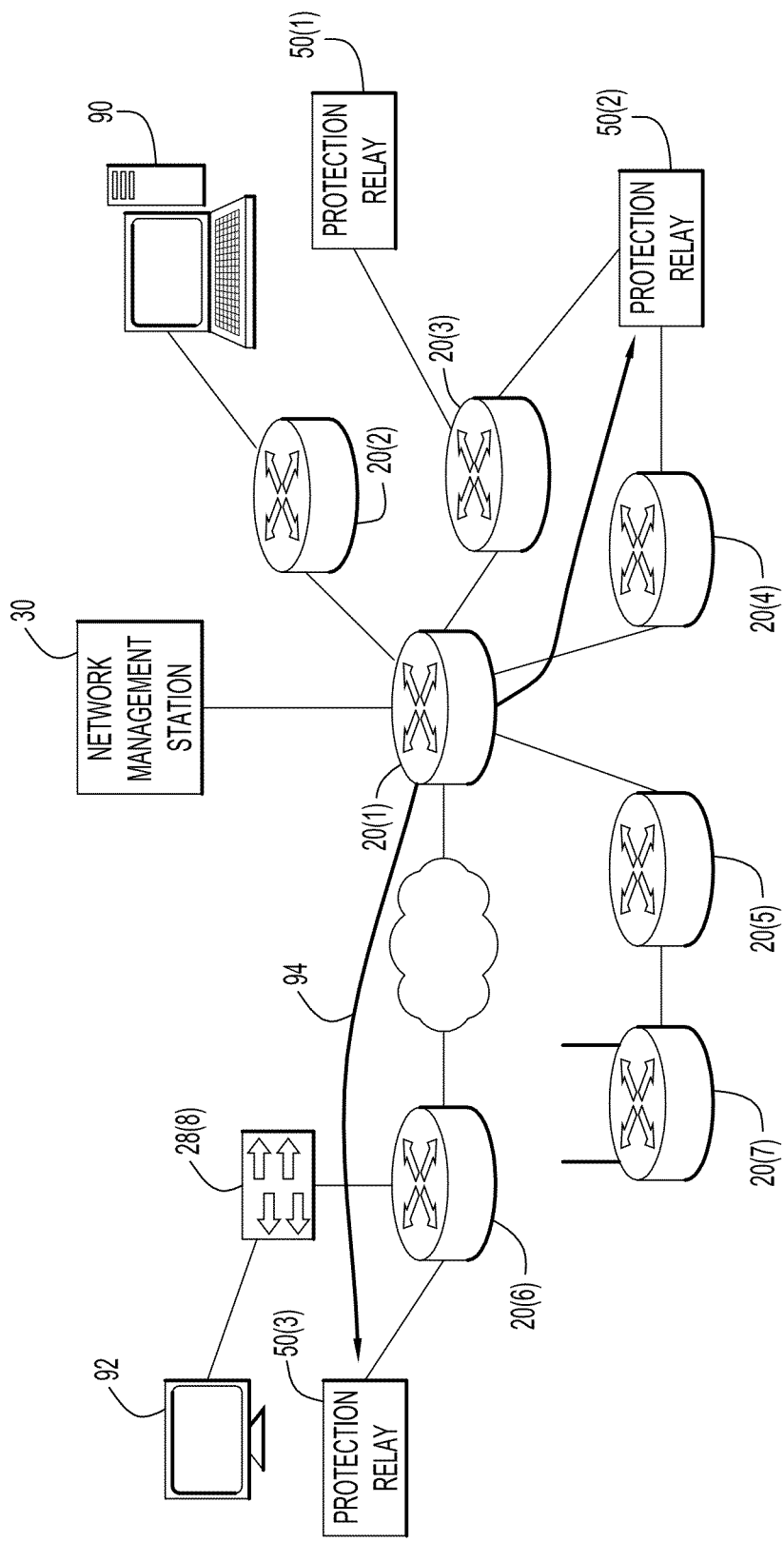
FIG. 6 is a diagram showing a first example scenario for the utility application traffic monitoring techniques described herein.
Figure 7:
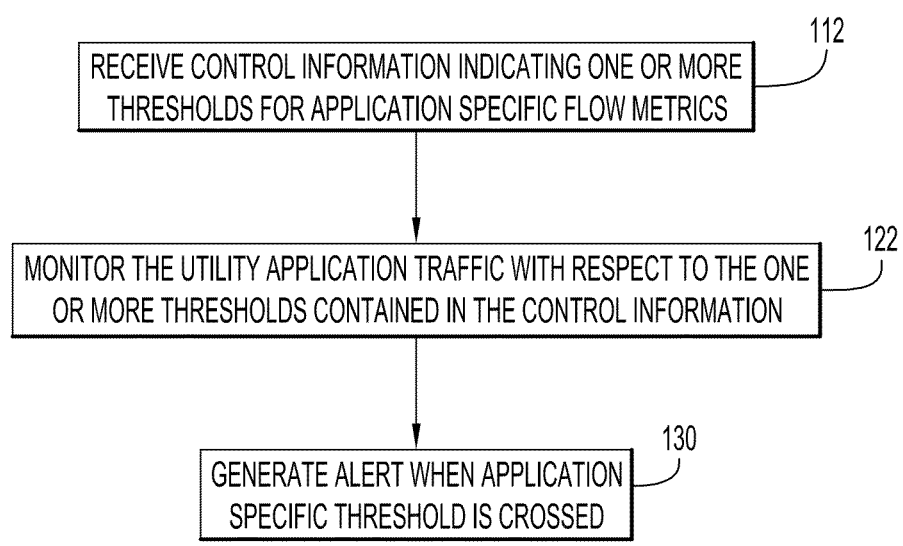
FIG. 7 is a flow chart depicting an example of operations performed in a network device for the scenario of FIG. 6.

FIGS. 6 and 7 depict an example scenario for an application-aware flow threshold alert. In this scenario, a network administrator enters data to the network management station 30 to generate control information that is sent to at least one network device to monitor traffic for certain utility applications, and to receive an alert when certain application specific flow metrics cross certain thresholds. This allows the network management station 30 to take action in order to prevent network induced drops of quality to the utility application(s).

In this example, the network devices are shown at reference numerals 20(1)-20(8), where network devices 20(1)-20(6) are routers, network device 20(7) is a wireless router and network device 20(8) is a switch. FIG. 6 also shows protection relays 40(1)-40(3), where protection relay 50(1) is coupled to network device 20(3), protection relay 50(2) is coupled to network device 20(4) and protection relay 50(3) is coupled to network device 20(6). Connected to network device 20(2) is a block of servers or other computing devices (e.g., laptop computer) shown at reference numeral 90. Connected to network device 20(8) is a user terminal 92.

Referring to FIG. 7, operations of the utility application traffic monitoring process logic 100 running in network device 20(1) are described for the scenario depicted in FIG. 6. A network administrator with access to the network management station 30 uses a suitable interface, e.g., Command Line Interface (CLI), to cause the network management station 30 to send control information that causes the network device 20(1) to perform passive performance metrics collection for all flows associated with a particular utility application, such as Teleprotection flows. An example of such a flow between protection relays 50(2) and 50(3) is shown at reference numeral 94 in FIG. 6. At 112, the network device 20(1) receives from the network management station 30 control information indicating one or more threshold for application specific flow metrics for Teleprotection flows. At 122, the network device 20(1) automatically monitors the headers (that have been inserted into the utility application traffic packets as shown in FIG. 2) for the Teleprotection traffic flows with respect to the one or more thresholds contained in the control information received at 112. For example, the network device 20(1) evaluates packet drops/loss, delay, latency and jitter of the Teleprotection traffic with respect to thresholds for packet drops, delay, latency and/or jitter. At 130, the network device 20(1) generates an alert when an application specific threshold is crossed. For example, the network device 20(1) generates an alert when the packet loss/drop rate and/or jitter for the Teleprotection traffic that passes through the network device 20(1) crosses a corresponding threshold. The network device 20(1) may generate the alert via a Syslog or Simple Network Management Protocol (SNMP) trap to report the threshold crossing event, together with additional information, such as current metrics, node and flow information, and other information that identifies the session that is being monitored.

Figure 8:
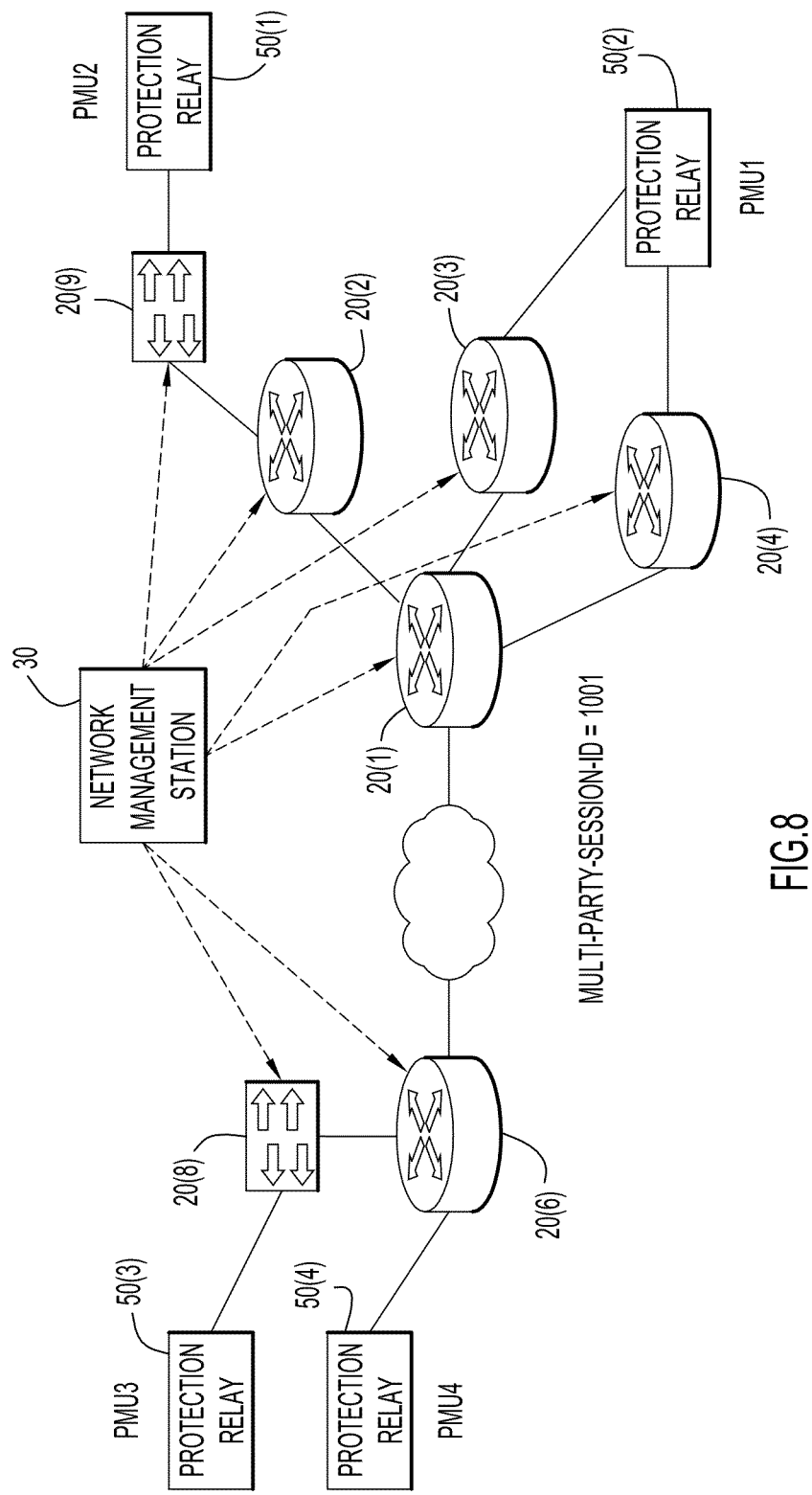
FIG. 8 is a diagram showing a second example scenario for the utility application traffic monitoring techniques described herein.
Figure 9:
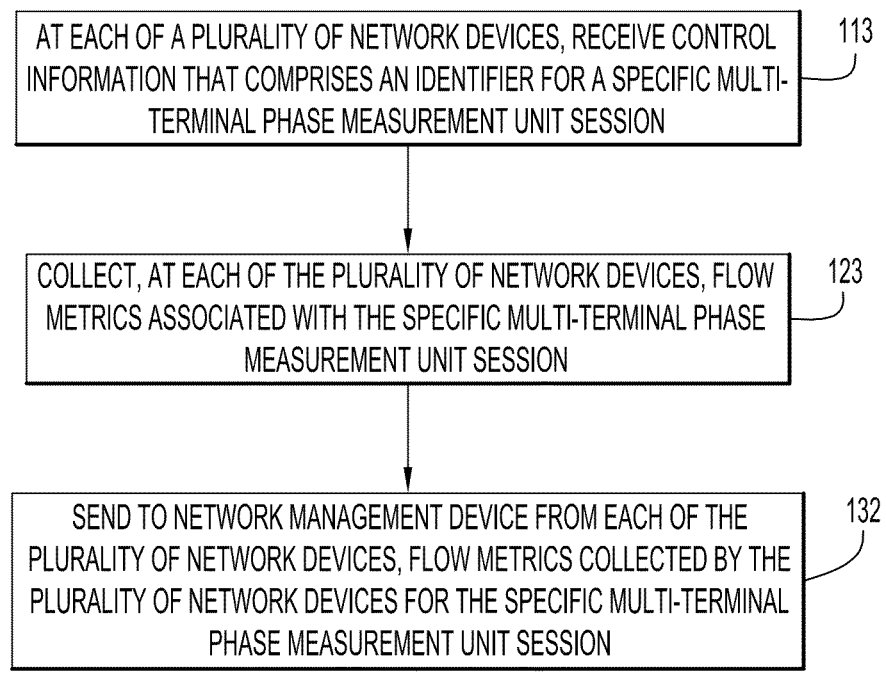
FIG. 9 is a flow chart depicting an example of operations performed in a network device for the scenario of FIG. 8.

FIGS. 8 and 9 illustrate another example scenario in which multi-party PMU session flow metrics are monitored. For example, a network administrator desires to monitor a multi-party PMU session that involves multiple PMU/Protection relays for multi-terminal protection. Again, a network administrator, through the network management station 30, uses suitable interface to send control information to multiple network devices to cause them to perform passive performance metric collection to monitor flow metrics with a specific multi-party session identifier (ID). FIG. 8 shows an example multi-party PMU session ID of "1001". At 113, each of a plurality of network devices which are to participate in this monitoring scenario receive control information that comprises an identifier for a specific multi-party (multi-terminal) PMU session to monitor. For example, network devices 20(1)-20(4), 20(6), 20(8) and 20(9) receive the control information from the network management station 30 with the specified multi-party PMU session ID. At 123, each of these network devices collects flow metrics associated with the specific multi-terminal PMU session. At 132, the network devices each send their collected flow metrics for the specific multi-terminal PMU session to the network management station 30. The network management station 30 then correlates the flow metric data received from the plurality of network devices with the identifier for the specific multi-terminal PMU session, e.g., "1001" in the example shown in FIG. 8. Examples of flow metric data may include packet drop rates, jitter, latency, etc. This allows the network management station 30 to present the overall flow conditions in the network in order to give a network administrator a complete view of the specific multi-terminal PMU session.

Figure 10:
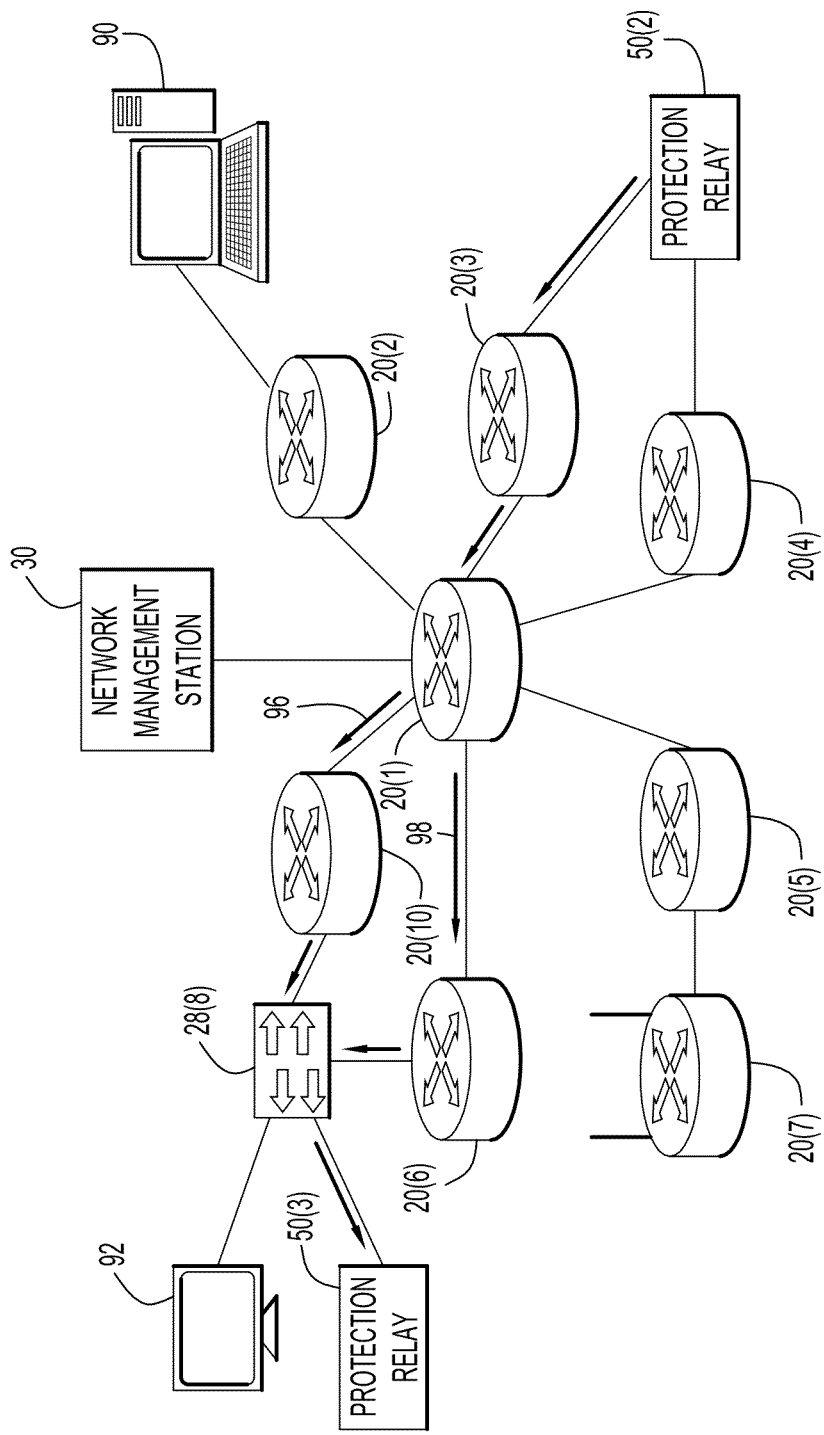
FIG. 10 is a diagram showing a third example scenario for the utility application traffic monitoring techniques described herein.
Figure 11:
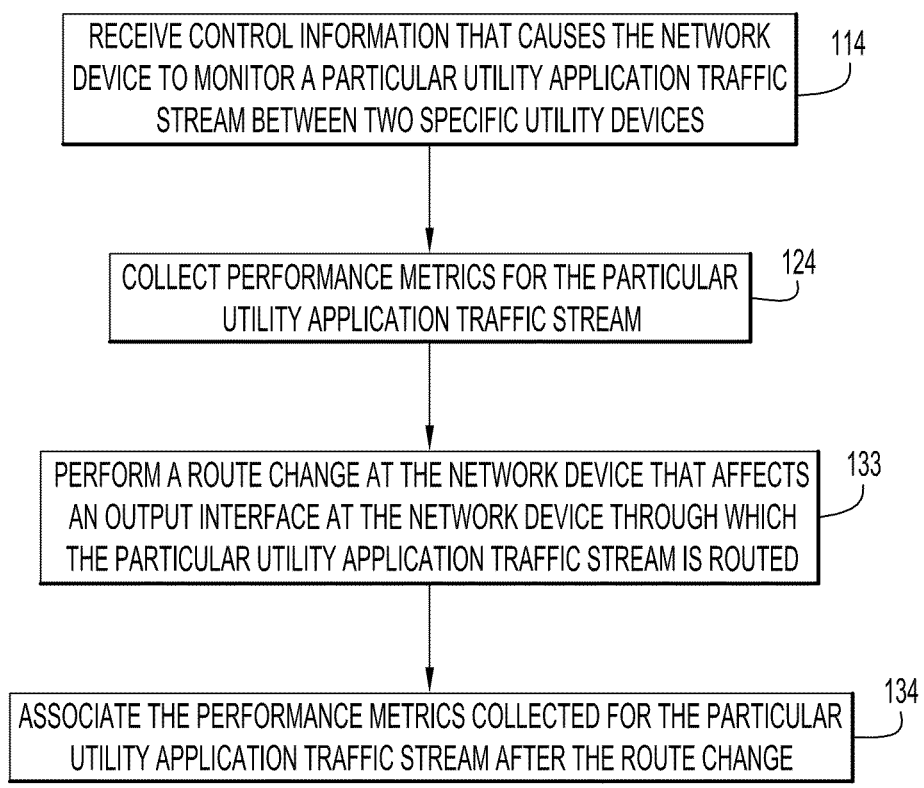
FIG. 11 is a flow chart depicting an example of operations performed in a network device for the scenario of FIG. 10.

FIGS. 10 and 11 illustrate an example scenario for flow metrics correlation with a route change at a network device. In this scenario, a network administrator wants to monitor a flow to collect statistics associated with the flow even after a route change at a router or switch. As shown in FIG. 10, there is a path 96 for a flow Teleprotection between protection relay 50(2) and protection relay 50(3) that passes through routers 20(3), 20(1), 20(10) and 20(8). However, at some point in time, router 20(1) makes a route change (due to traffic load conditions or other reasons) so that the Teleprotection flow route is changed to path 98 through router 20(6) instead of through router 20(10).

A network administrator uses a suitable interface via network management station 30 to send control information to network device 20(1) causing it to perform passive performance metrics collection for Teleprotection traffic between protection relay 50(2) and protection relay 50(3). As shown in FIG. 11, at 114, the network device 20(1) receives control information from the network management station 30 that causes the network device 20(1) to monitor a particular utility application traffic stream, e.g., Teleprotection traffic stream, between two specific utility devices, e.g., protection relay 50(2) and protection relay 50(3). The control information specifies the application type (Teleprotection) and includes an identifier for the particular traffic stream, e.g., 5-tuple identifying information for a particular Teleprotection stream between protection relay 50(2) and protection relay 50(3). At 124, the network device collects the performance metrics for the specified flow traffic based on application type and information identifying the particular Teleprotection stream. At 133, the network device 20(1) makes a route change that affects an output interface through which the particular utility application traffic (Teleprotection) stream is routed from network device 20(1), i.e., so that it now goes to router 20(6) instead of 20(10), on path 98. At 134, the network device 20(1) associates the performance metrics collected for the particular utility application traffic stream after the route change. Further, the network device 20(6) initiates passive performance monitoring and reports the data based on thresholds to the network management station 30.

Figure 12:
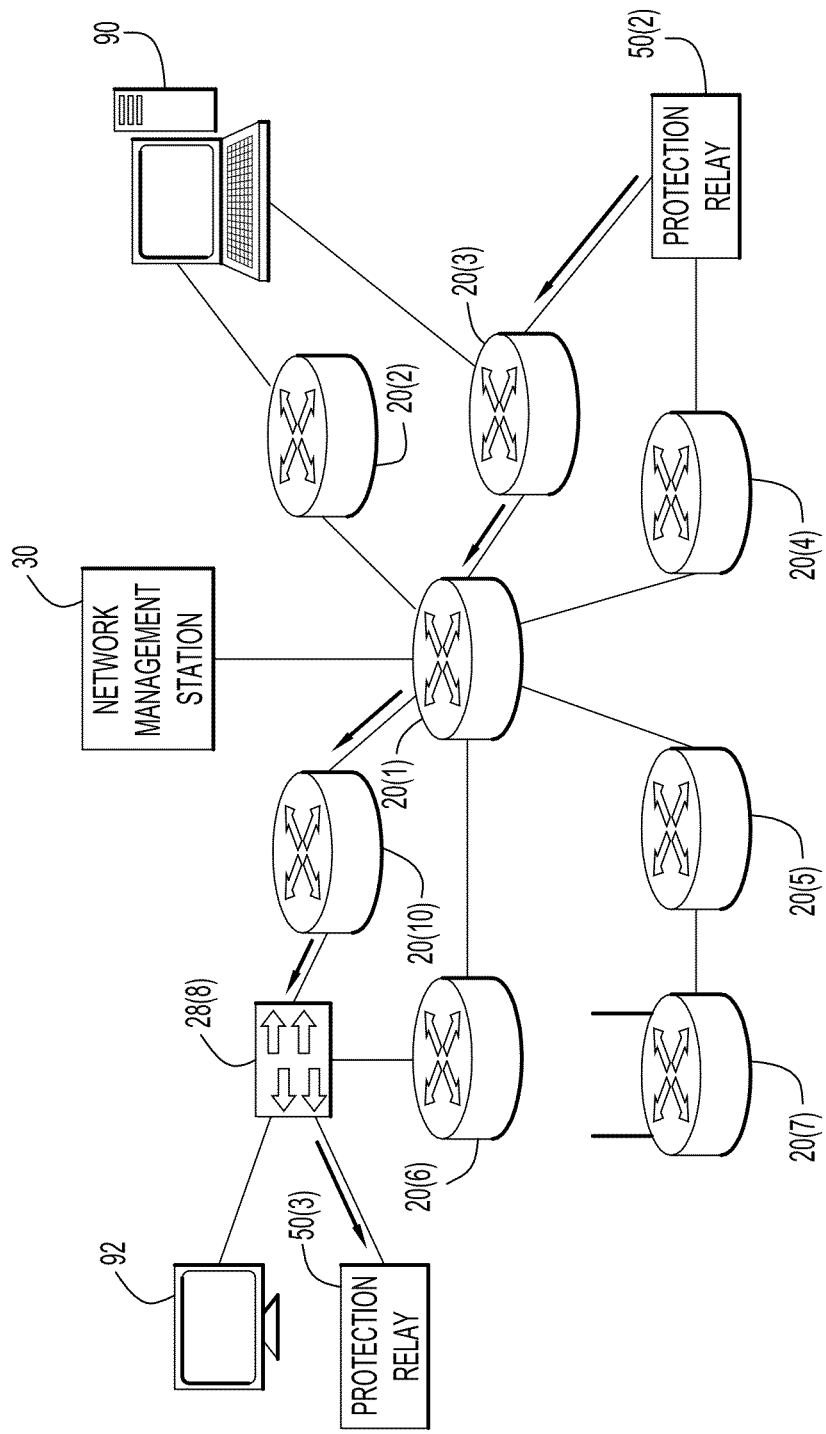
FIG. 12 is a diagram showing a fourth example scenario for the utility application traffic monitoring techniques described herein.
Figure 13:
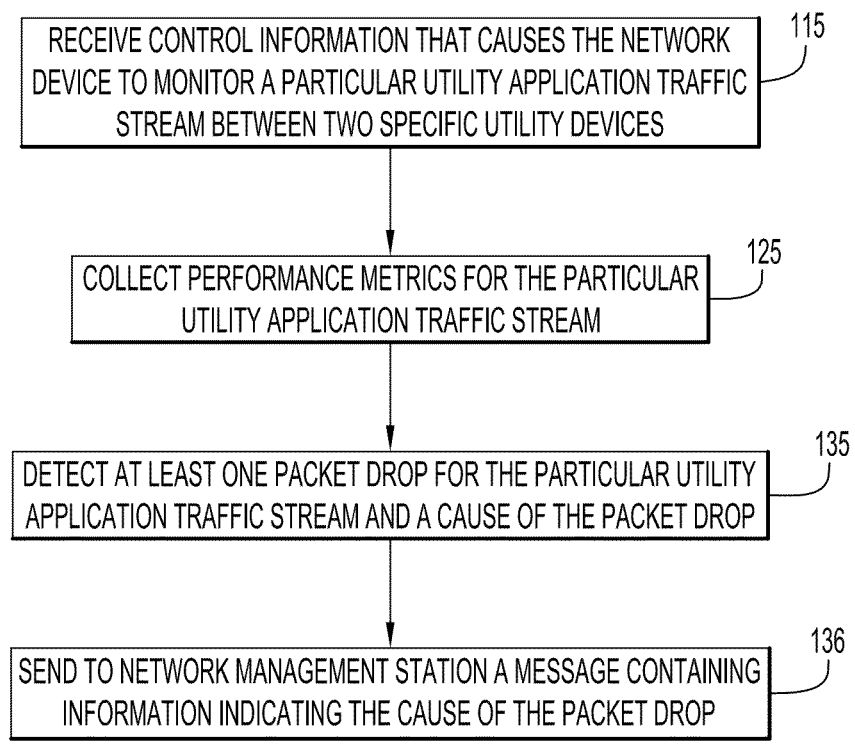
FIG. 13 is a flow chart depicting an example of operations performed in a network device for the scenario of FIG. 12.

FIGS. 12 and 13 depict a scenario for packet drop reason reporting. In this scenario, when a packet drop is observed, the network administrator wants to determine the reason for the packet drop. The network administrator uses a suitable interface via the network management station 30 to send control information to network device 20(1) to enable passive performance metrics collection at network device 20(1) for Teleprotection traffic between protection relay 50(2) and protection relay 50(3). At 115, the network device 20(1) receives control information from the network management station 30 that causes the network device 20(1) to monitor a particular utility application (e.g., Teleprotection) traffic stream between two specific utility devices, e.g., between protection relay 50(2) and protection relay 50(3). At 125, the network device 20(1) collects performance metrics for the particular utility application traffic stream. At 135, the network device 20(1), through the use of the header information inserted into packets for the particular utility application traffic stream, detects at least one packet drop for the particular utility application traffic stream and a cause of the packet drop, e.g. low Quality of Service (QoS) priority, or network traffic congestion. At 136, the network device 20(1) sends to the network management station 30 a message containing information indicating presence of the packet drop, number of packets dropped, and the cause of the packet drop.

Figure 14:
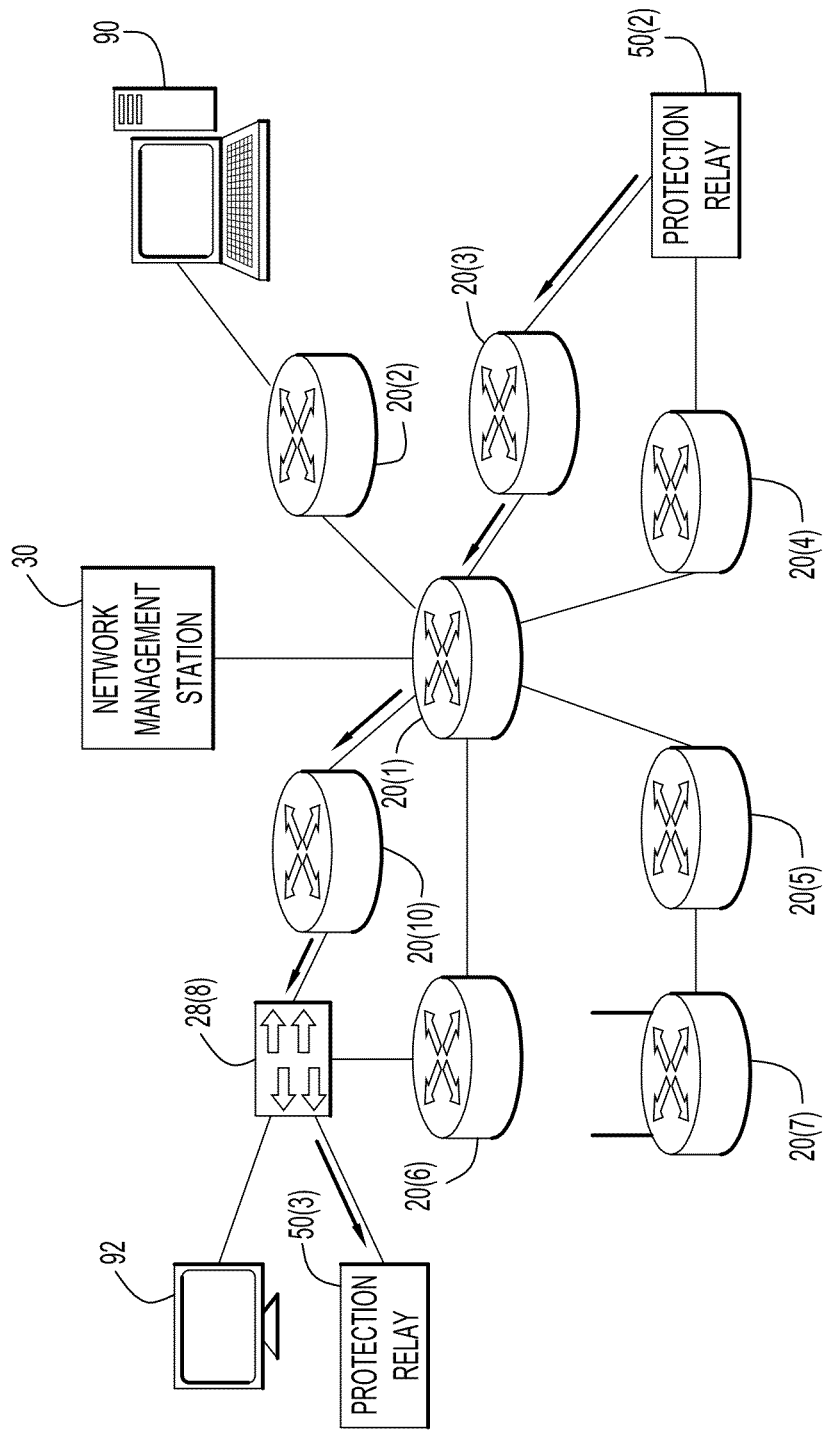
FIG. 14 is a diagram showing a fifth example scenario for the utility application traffic monitoring techniques described herein.
Figure 15:
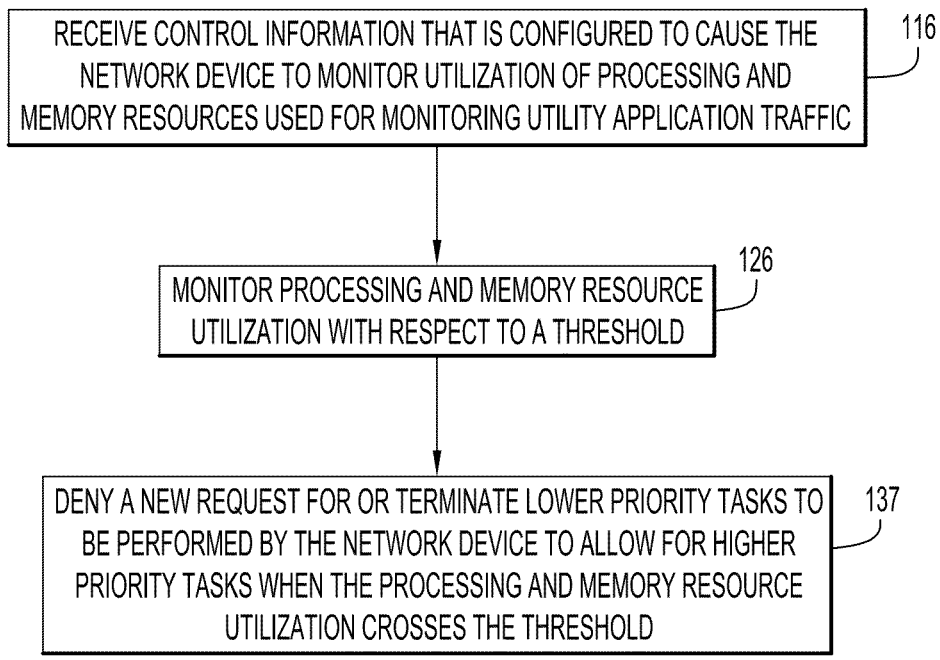
FIG. 15 is a flow chart depicting an example of operations performed in a network device for the scenario of FIG. 14.

FIGS. 14 and 15 illustrate an example scenario for resource throttling for passive monitoring. In this scenario, a network administrator wants to ensure that certain application utility traffic monitoring tasks do not consume too much of the resources on a network devices so that the basic functionality of the network devices is not impacted. The network administrator uses a suitable interface via the network management station 30 send to network device 20(1) control information containing a threshold for processing and memory resources utilization for monitoring utility application traffic. At 116, the network device 20(1) receives from the network management station 30 control information that is configured to cause the network device 20(1) to monitor utilization of processing and memory resources used for monitoring utility application traffic with respect to a specified threshold. At 126, the network device monitors processing and memory resources utilization with respect to the threshold. For example, when the network device 20(1) receives a monitoring request from the network management station 30, it checks current processing and memory resource utilization/consumption level (for monitoring operations) with respect to the threshold. At 137, the network device 20(1) denies a new monitoring request or terminates an existing one (depending on its relative priority) to allow for higher priority tasks to be continued or performed when the processing and memory resource utilization crosses the threshold. In this way, the network device 20(1) will be able to continue to have the resources to perform its higher priority tasks.

Figure 16:
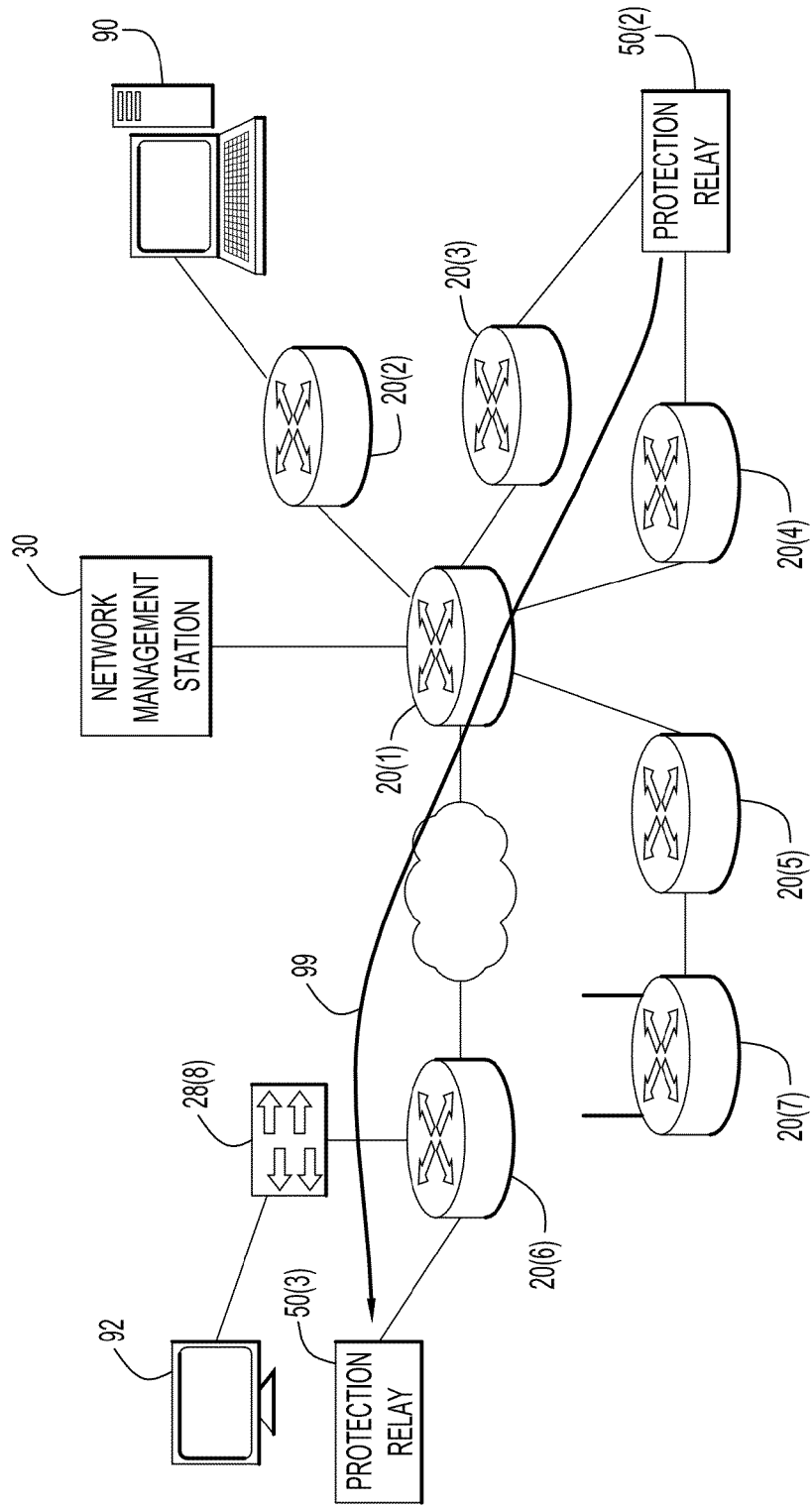
FIG. 16 is a diagram showing a sixth example scenario for the utility application traffic monitoring techniques described herein.
Figure 17:
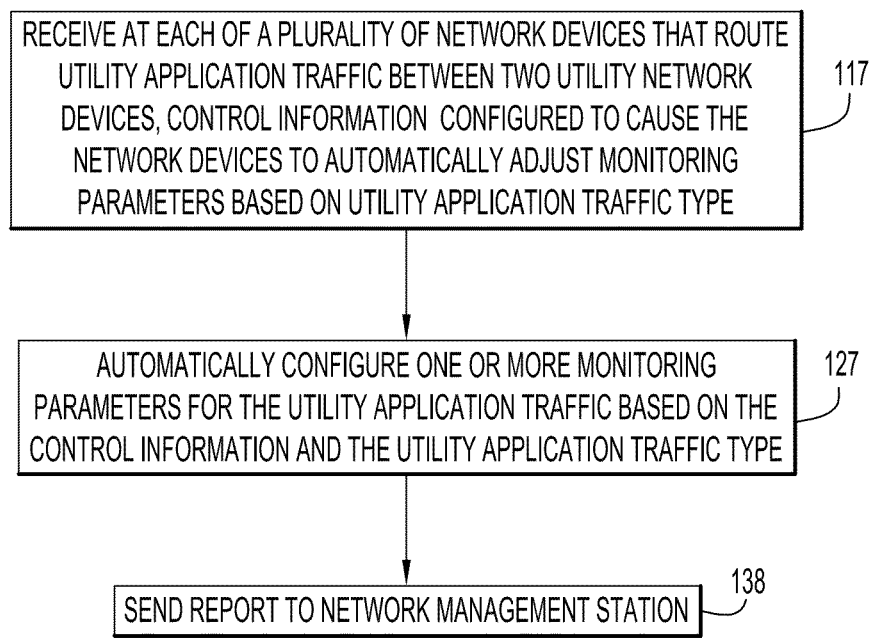
FIG. 17 is a flow chart depicting an example of operations performed in a network device for the scenario of FIG. 16.

FIGS. 16 and 17 illustrate an example scenario for metadata-based monitoring configuration. In this scenario, the network administrator wants the network to automatically adjust certain monitoring parameters, such as timeout value, sampling rate, etc., based on knowledge of a utility application traffic type. The network administrator uses a suitable interface via the network management station 30 to enable passive performance metrics collection on network devices 20(1), 20(3) and 20(6) to monitor traffic from protection relay 50(2) to protection relay 50(3). This traffic stream is shown at reference numeral 99 in FIG. 16.

Referring to FIG. 17, at 117, each of the network devices 20(1), 20(3) and 20(6) that routes utility application traffic between two utility devices, receives control information from the network management station that is configured to cause the network devices to automatically adjust monitoring parameters based on utility application traffic type. At 127, the network devices 20(1), 20(3) and 20(6) automatically configure one or more monitoring parameters for the utility application traffic based on the control information and the metadata indicating the utility application traffic type. For example, the network devices may automatically configure themselves to monitor sampling rate, timeout value, and metering priority parameters associated with a Teleprotection traffic stream. At 138, the network devices send reports to the network management station.

The techniques described herein provide inline utility application-aware passive performance monitoring and instrumentation to ease the deployment, management and operation of a utility data network.

The above description is intended by way of example only.

What is claimed is:

1. A method comprising:
at each network device of a plurality of network devices which routes utility application traffic for a multi-terminal phase measurement unit session involving a plurality of utility devices that perform phase measurement operations in a utility network, receiving control information configured to cause each network device to monitor utility application traffic messages that pass through each network device from a specific first utility device to a specific second utility device via a particular utility application traffic stream; and monitoring a header inserted into the utility application traffic messages based on the control information, wherein the header comprises bits which specify an identifier of the utility application traffic messages from the specific first utility device to the specific second utility device; and identifying the utility application traffic from the specific first utility device to the specific second utility device based on the identifier.

2. The method of claim 1, wherein monitoring comprises evaluating a sequence number and a timestamp contained in the header of utility application traffic messages.

3. The method of claim 2, wherein receiving comprises receiving control information indicating one or more thresholds for application specific flow metrics, and wherein monitoring comprises monitoring the utility application traffic with respect to the one or more thresholds contained in the control information.

4. The method of claim 3, and further comprising generating an alert when the utility application traffic crosses loss, delay and/or jitter thresholds, and sending the alert from the network device to a network management device.

5. The method of claim 2, wherein monitoring comprises:
collecting performance metrics for the particular utility application traffic stream specified by the control information;
detecting a route change at the network device that affects an output interface at the network device through which the particular utility application traffic stream is routed; and
associating the performance metrics collected for the particular utility application traffic stream after the route change.

6. The method of claim 2, wherein monitoring comprises collecting:
performance metrics for the particular utility application traffic stream;
detecting at least one packet drop for the particular utility application traffic stream and a cause of the packet drop; and
further comprising sending to a network management device a message containing information indicating the cause of the packet drop.

7. The method of claim 1, wherein receiving comprises receiving control information that comprises an identifier for a specific multi-terminal phase measurement unit session, and wherein monitoring comprises collecting, at each of the plurality of network devices, flow metrics associated with the specific multi-terminal phase measurement unit session.

8. The method of claim 7, and further comprising, at a network management device, receiving, from each of the plurality of network devices, flow metrics collected by the plurality of network devices for the specific multi-terminal phase measurement unit session; and correlating the flow metrics received from the plurality of network devices with the identifier for the specific multi-terminal phase measurement unit session.

9. The method of claim 1, wherein receiving comprises receiving control information to monitor utilization of processing and memory resources used for monitoring utility application traffic; and wherein monitoring comprises monitoring processing and memory resource utilization with respect to a threshold; and further comprising denying a new request to monitor utility application traffic or terminating lower priority monitoring tasks to be performed to allow for higher priority monitoring tasks when the processing and memory resource utilization crosses the threshold.

10. The method of claim 1, wherein the control information is configured to cause the plurality of network devices to automatically adjust monitoring parameters based on utility application traffic type, and further comprising each of the plurality of network devices automatically configuring one or more monitoring parameters for the utility application traffic based on the control information and the utility application traffic type.

11. The method of claim 1, wherein monitoring comprises monitoring a Real-Time Transport Protocol header inserted into utility application traffic messages.

12. The method of claim 1, wherein receiving comprises receiving the control information from a network management station.

13. An apparatus comprising:
 a network interface unit configured to enable communications over a network;
 switch hardware configured to route packets in the network;
 a processor coupled to the network interface unit and switch hardware, the processor configured to:
  receive control information configured to cause the processor to route utility application traffic for a multi-terminal phase measurement unit session involving a plurality of utility devices that perform phase measurement operations in a utility network, and to monitor utility application traffic messages in the network from a specific first utility device to a specific second utility device via a particular utility application traffic stream;
  monitor a header inserted into the utility application traffic messages based on the control information, wherein the header comprises bits which specify an identifier of the utility application traffic messages from the specific first utility device to the specific second utility device; and
  identify the utility application traffic from the specific first utility device to the specific second utility device based on the identifier.

14. The apparatus of claim 13, wherein the processor is configured to monitor the utility application traffic messages by evaluating a sequence number and a timestamp contained in the header of utility application traffic messages.

15. The apparatus of claim 14, wherein the processor is configured to receive control information indicating one or more thresholds for application specific flow metrics, and to monitor the utility application traffic with respect to the one or more thresholds.

16. The apparatus of claim 15, wherein the processor is configured to generate an alert when the utility application traffic crosses loss, delay and/or jitter thresholds, and to send the alert to a network management device.

17. The apparatus of claim 14, wherein the processor is configured to receive control information that comprises an identifier for a specific multi-terminal phase measurement unit session, and to collect flow metrics associated with the specific multi-terminal phase measurement unit session.

18. The apparatus of claim 14, wherein the processor is configured to collect performance metrics for the particular utility application traffic stream specified by the control information, detect a route change that affects an output interface through which the particular utility application traffic stream is routed, and associate the performance metrics collected for the particular utility application traffic stream after the route change.

19. One or more non-transitory computer readable storage media encoded with software comprising computer executable instructions and when the software is executed operable to:
 receive control information configured to cause a processor in a network device to route utility application traffic for a multi-terminal phase measurement unit session involving a plurality of utility devices that perform phase measurement operations in a utility network, and to monitor utility application traffic messages in a network from a specific first utility device to a specific second utility device via a particular utility application traffic stream;
 monitor a header inserted into the utility application traffic messages based on the control information, wherein the header comprises bits which specify an identifier of the utility application traffic messages from the specific first utility device to the specific second utility device; and
 identify the utility application traffic from the specific first utility device to the specific second utility device based on the identifier.

20. The computer readable storage media of claim 19, wherein the instructions that are operable to monitor comprise instructions that are operable to monitor the utility application traffic messages by evaluating a sequence number and a timestamp contained in the header of utility application traffic messages.

21. The computer readable storage media of claim 20, wherein the instructions that are operable to receive comprise instructions operable to receive control information indicating one or more thresholds for application specific flow metrics, and the instructions operable to monitor comprise instructions operable to monitor the utility application traffic with respect to the one or more thresholds contained in the control information.

22. The computer readable storage media of claim 21, and further comprising instructions that are operable to generate an alert when the utility application traffic crosses the loss, delay and/or jitter thresholds, and to send the alert from the network device to a network management device.

23. The computer readable storage media of claim 20, wherein the instructions that are operable to receive comprise instructions operable to receive control information that comprises an identifier for a specific multi-terminal phase measurement unit session, and the instructions operable to monitor comprise instructions operable to collect flow metrics associated with the specific multi-terminal phase measurement unit session.

* * * * *